United States Patent [19]
Ryu et al.

[11] Patent Number: 5,463,381
[45] Date of Patent: Oct. 31, 1995

[54] DATABASE SYSTEM HAVING A PLURALITY OF NODES COMMUNICATING WITH EACH OTHER VIA COMMUNICATION NETWORK

[75] Inventors: Tadamitsu Ryu; Gen Kakehi; Shigeru Aoe, all of Kanagawa, Japan

[73] Assignee: Fujitsu Limited, Kawasaki, Japan

[21] Appl. No.: 234,615

[22] Filed: Apr. 28, 1994

Related U.S. Application Data

[63] Continuation of Ser. No. 776,432, Oct. 17, 1991, abandoned.

[30] Foreign Application Priority Data

Oct. 17, 1990 [JP] Japan ..................... 2-277989

[51] Int. Cl.⁶ ..................................... G06F 13/14
[52] U.S. Cl. ................. 340/825.15; 340/825.05; 395/600; 395/497.05; 395/200.08
[58] Field of Search .................. 340/825.05, 825.08, 340/825.15, 825.50, 827.3; 371/8.2, 10.1, 10.2, 11.1, 11.2, 11.3; 370/85.8, 95.2; 395/425

[56] References Cited

U.S. PATENT DOCUMENTS

| | | | |
|---|---|---|---|
| 4,716,408 | 12/1987 | O'Conner et al. | 340/825.5 |
| 4,881,164 | 11/1989 | Hailsern et al. | 395/200 |

FOREIGN PATENT DOCUMENTS

| | | |
|---|---|---|
| 0204993 | 12/1986 | European Pat. Off. . |
| 0271945 | 6/1988 | European Pat. Off. . |
| 60-230748 | 11/1985 | Japan . |
| 2-239355 | 9/1990 | Japan . |
| 2-271749 | 11/1990 | Japan . |

OTHER PUBLICATIONS

Motzkin et al., "The design of distributed databases with cost optimization and integration of space constraints," *AFIPS Conference Proceedings 1987 National Computer Conference*, vol. 56, Jun. 18, 1987, Chicago, Ill., pp. 563-572.

Demers, "Distributed files for SAA," *IBM Systems Journal*, vol. 27, No. 3, Sep. 1988, Armonk, N.Y., pp. 348-361.

*Primary Examiner*—Michael Horabik
*Attorney, Agent, or Firm*—Staas & Halsey

[57] ABSTRACT

A database system includes a communication network, and a plurality of nodes. Each node includes a data storage device, a management part managing a status of the data stored in the data storage device, and a data storage request part for generating an alternative data storage device assignment request for requesting at least one of other nodes among the plurality of nodes to store data in the data storage device of the other node via the communication network when a predetermined condition is satisfied. A determining part receives the alternative data storage device assignment request from a request node which generates the alternative data storage device assignment request and assigns a storage area in the data storage device for storing data related to the alternative data storage device assignment request by referring to the status of the data managed by the management part when the data storage device of the other node has an enough storage capacity to store the data related to the alternative data storage device assignment request.

7 Claims, 8 Drawing Sheets

| COMMAND | ERASE BIT | STORAGE POSITION | | |
| --- | --- | --- | --- | --- |
| | | BEGINNING ADDRESS | SIZE (BYTES) | NODE NUMBER |
| C001 | | P001 | 35 | — |
| V001 | | — | — | 2-3 |
| C002 | | — | — | — |

DATABASE SYSTEM HAVING A PLURALITY OF NODES COMMUNICATING WITH EACH OTHER VIA COMMUNICATION NETWORK

This application is a continuation, of application No. 07/776,432, filed Oct. 17, 1991, now abandoned.

BACKGROUND OF THE PRESENT INVENTION

1. Field of the Invention

The present invention generally relates to a database system having a plurality of nodes (terminal devices) coupled together via a communication network. More particularly, the present invention is concerned with a database system in which each node can use data storage devices stored in other nodes.

2. Description of the Related Art

A conventional distributed database system has a host device and a plurality of nodes controlled by the host device. Each node has its own data storage device. A conventional database system is designed so that each node can access only its own data storage device under the control of the host device. If such a data storage device is filled with data (files), the corresponding node cannot use its own data storage device. Thus, the storage capacity must be extended so that a new data storage device is connected to the node having the overflowed (i.e., filled) data storage device. As a result, the entire data storage capacity of the conventional database system cannot be used efficiently.

SUMMARY OF THE INVENTION

It is an object of the present invention to provide a database system capable of effectively using the entire data storage capacity of plural storage devices of the system.

This object of the present invention is achieved by a database system comprising:

a communication network; and a plurality of nodes coupled to the communication network;

each of the nodes comprising:

a data storage device for storing data;

management means, coupled to the storage device, for managing the status of the data stored in the data storage device;

data storage request means, coupled to the storage device and the management means, for generating an alternative data storage device assignment request for requesting at least one other node of the plurality of nodes to store data in the corresponding data storage device of that other node, via the communication network, when a predetermined condition is satisfied; and determining means, coupled to the management means, for receiving the alternative data storage device assignment request from such a request node, i.e., which generates the alternative data storage device assignment request, and for assigning a storage area in the corresponding data storage device of the other such node for storing data related to the alternative data storage device assignment request by referring to the status of the data managed by the management means when the associated data storage device of the receives node has sufficient storage capacity to store the data related to the alternative data storage device assignment request.

BRIEF DESCRIPTION OF THE DRAWINGS

Other objects, features and advantages of the present invention will become apparent from the following detailed description when read in conjunction with the accompanying drawings, in which.

DESCRIPTION OF THE PREFERRED EMBODIMENTS

Figure 1:
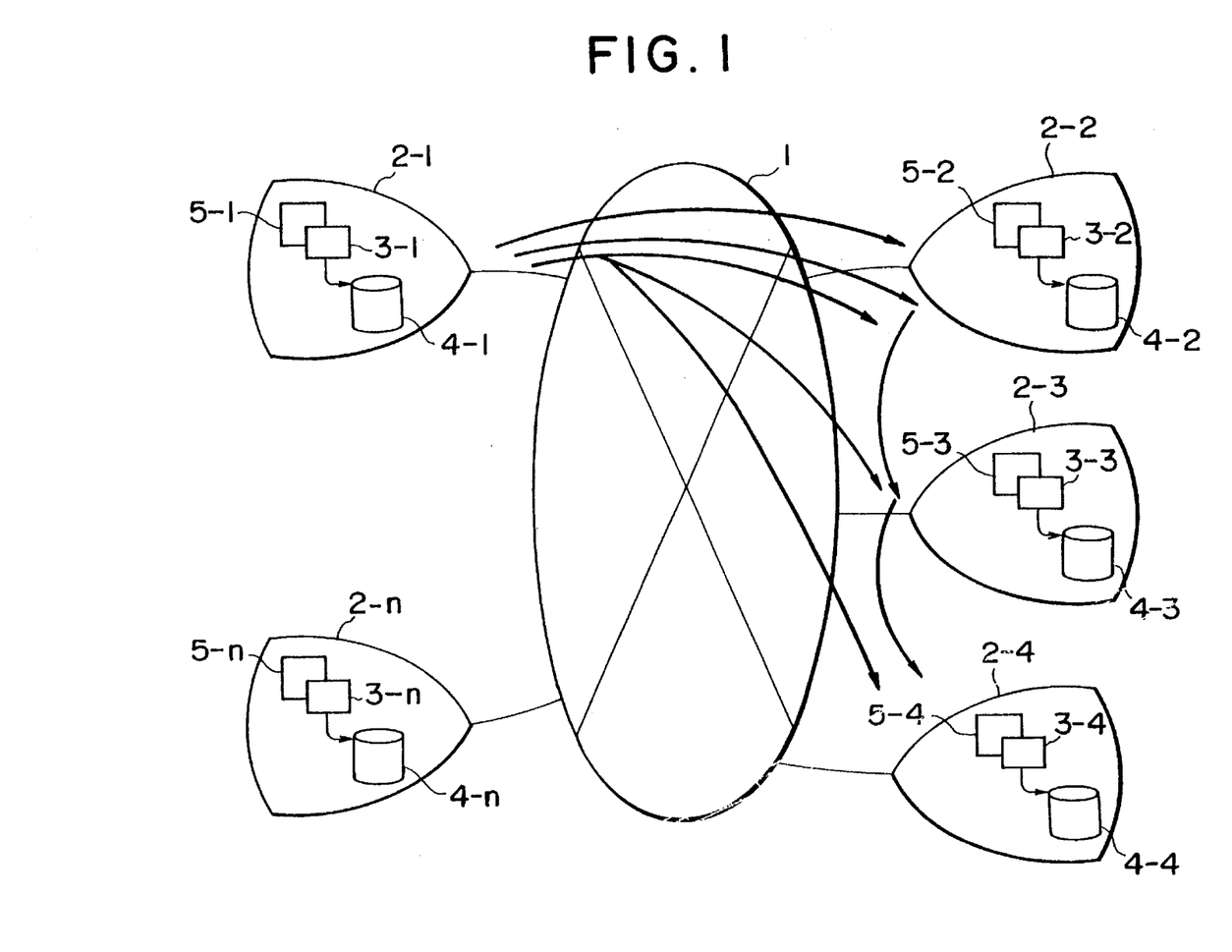
FIG. 1 is a block diagram of an outline of a database system according to a first preferred embodiment of the present invention.

FIG. 1 is a block diagram showing an outline of a database system according to a first preferred embodiment of the present invention. The database system shown in FIG. 1 includes a communication network 1 and nodes (terminals) 2-1 - 2-n, where n is an integer. The node 2-1 includes a file control table 3-1 formed in a memory, a data file storage device 4-1, and a data storage request processing unit 5-1. Similarly, the other nodes 2-2 - 2-n respectively include file control tables 3-2 - 3-n, data file storage devices 4-2 - 4-n, and data storage request processing units 5-2 - 5-n.

A file storage format of the data file storage device 4-1 is managed by the file control table 3-1. Similarly, file storage formats of the data file storage devices 4-2 - 4-n are respectively managed by the file control tables 3-2 - 3-n. Each of the nodes 2-1 - 2-n communicates with at least one of the other nodes via the communication network 1, and issues requests to write data into the file data storage device of at least one of the other nodes and to read data therefrom under the control of its own data storage request processing unit. For example, if the node 2-1 determines that its associated file data storage device 4-1 is filled with data, when requesting to write data into that associated file data storage device 4-1, the corresponding data storage request unit 5-1 requests, for example, the node 2-3 to write the data from the node 2-1 into the file data storage device 4-3 corresponding to the node 2-3.

Figure 2:
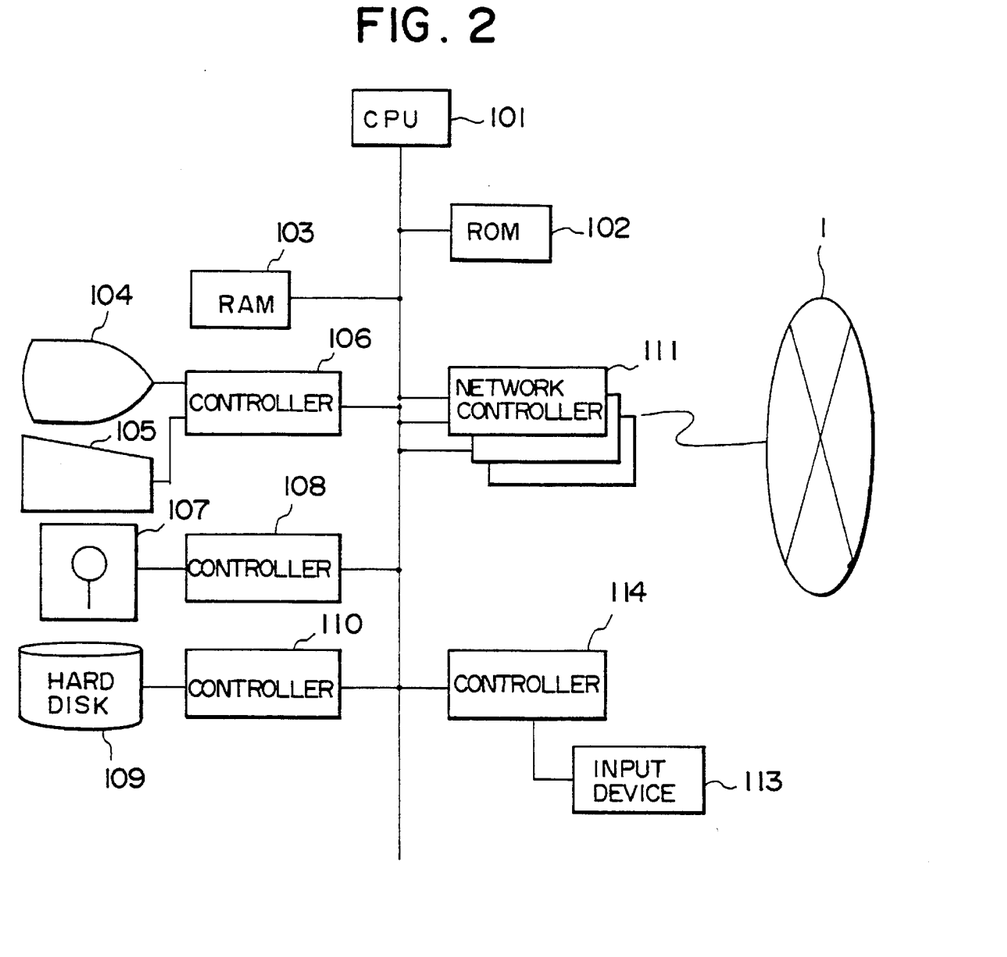
FIG. 2 is a block diagram of a node.

FIG. 2 is a block diagram of the hardware structure of each of the nodes 2-1 - 2-n. As shown, each node is composed of a CPU (Central Processing Unit) 101, a ROM 102, a RAM 103, a display device 104, a keyboard 105, an interface unit 106 which controls the display device 104 and the keyboard 105, a floppy disk device 107, an interface unit 108 which controls the floppy disk device 107, a hard disk device 109, an interface 110 which controls the hard disk device 109, network controllers 111, a bus 112, a data input device 113, such as an image scanner, and a controller 114 for controlling the data input device 113. As shown, the bus 112 mutually connects the CPU 101, the ROM 102, the RAM 103, the interface units 106, 108 and 110, the network controllers 111, and the controller 114. It is not necessary for each node to have all structural elements shown in FIG. 2. It is possible to add a desired structural element to the configuration shown in FIG. 2.

The data file control table 3-i (i=1, 2, 3, 4, ..., n) shown in FIG. 1 is formed in, for example, the RAM 103, and the file data storage device 4-i corresponds to, for example, the hard disk device 109. The storage request processing unit 5-1 shown in FIG. 1 corresponds to the CPU 101. The CPU 101 controls the entire structure of the node in accordance with programs stored in the ROM 102. An application program is stored in, for example, the floppy disk device 107, and read out therefrom and written into the RAM 103.

Figure 3A:
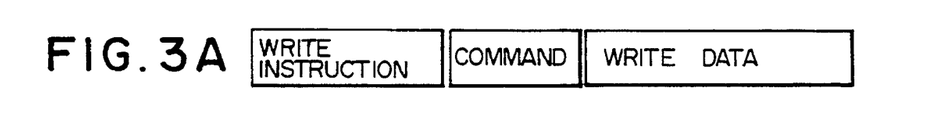
FIG. 3A is a block diagram of a data write request.
Figure 3B:
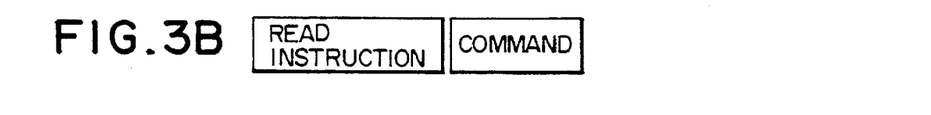
FIG. 3B is a block diagram of a data read request.

The application program requests a data write operation and a data read operation in accordance with the respective formats shown in FIGS. 3A and 3B. FIG. 3A shows a data write request format, which has a header having a write instruction, a command area in which a command specifying write data is stored, and a write data area having write data to be written. FIG. 3B shows a data read request, which has a header having a read instruction, and a command area in which a command specifying read data is stored.

In order to process the data write and read requests from the application program, it is necessary to assign a command to new data which has not yet been processed by the application program.

Figure 4A:
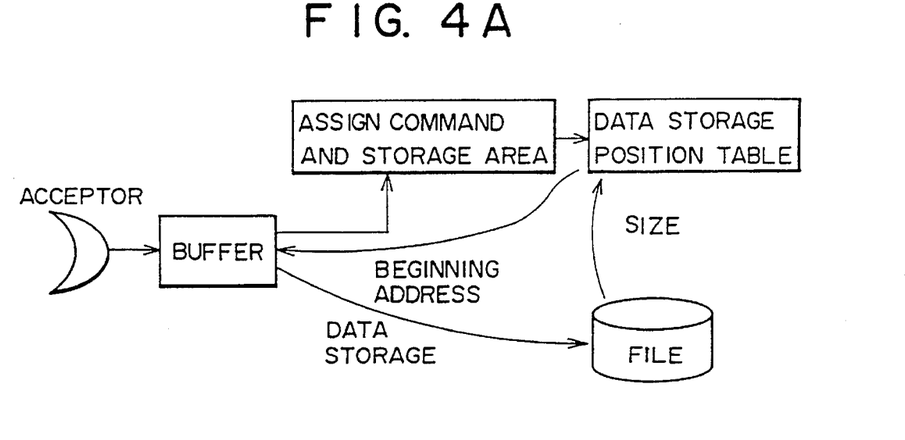
FIG. 4A is a block diagram showing how to write data in a file data storage device.
Figure 4B:
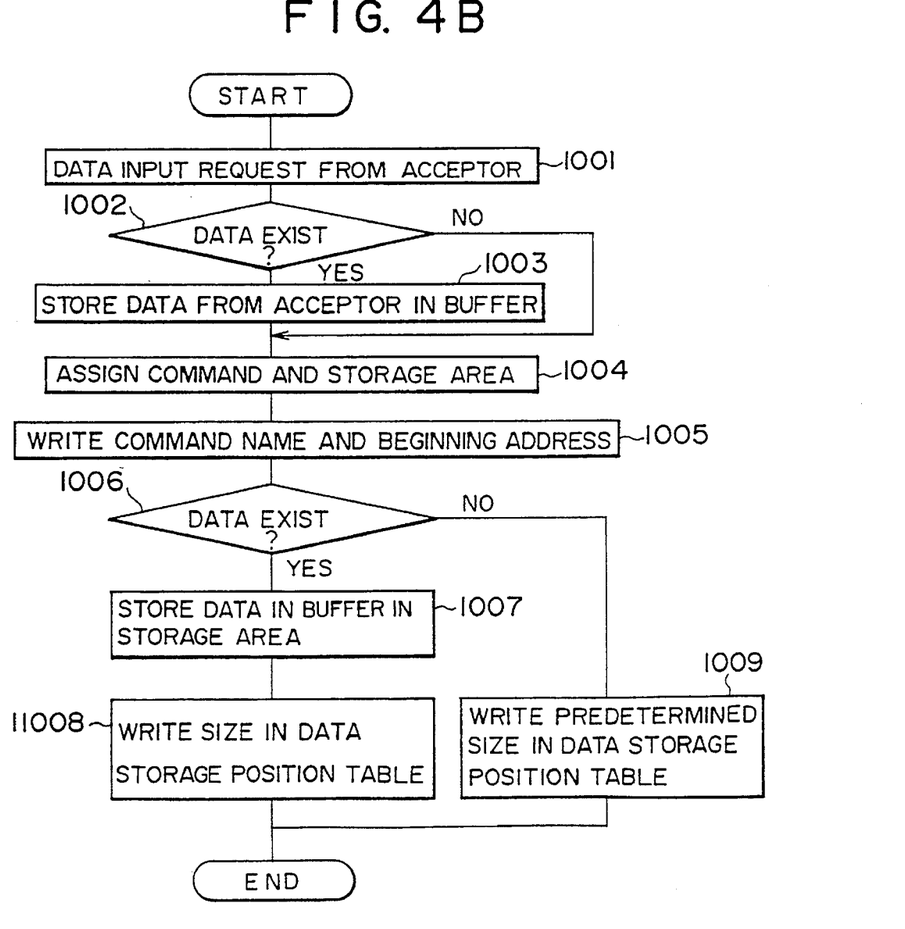
FIG. 4B is a flowchart of a procedure which achieves the data write operation shown in FIG. 4A.

FIG. 4A is a diagram showing how to process new data which is input via an acceptor, such as an image scanner, and FIG. 4B is a flowchart of a procedure for executing the process shown in FIG. 4A. At step 1001, the CPU 101 receives a data input request from an acceptor, such as the keyboard 105, or the image scanner. At step 1002, the CPU 101 determines whether or not the data input request has associated data. When the result at step 1002 is YES, the CPU 101 executes step 1003, at which step the data is temporarily stored in a buffer (FIG. 4A) formed in, for example, the RAM 103 shown in FIG. 2. Then, the CPU 101 executes step 1004, which is also executed when the result obtained at step 1002 is NO. At step 1004, the CPU 101 assigns a command and a storage area in the hard disk device 109 to the input at step 1005.

The command is assigned to each data on the basis of the type of data. If the data is a code, a command "C" is assigned to the data. If the data is dot data, a command "D" is assigned to the data. If the data is vector 1 data, a command "V" is assigned to the data. Further, in order to discriminate data in the same group from each other, a number is added to each command, such as C001 or C002. The storage area in the hard disk device 109 assigned by the CPU 101 is an idle area, subsequent to the area in which data has been written.

At step 1005, the CPU 101 writes the command and a beginning address of the assigned storage area in a data storage position table formed in, for example, the RAM 103. At step 1006, the CPU 101 determines whether or not the data input request, which is input at step 1001, has data to be written. When the result at step 1006 is YES, at step 1007 the CPU 101 reads out the beginning address of the assigned storage area from the data storage position table, and writes the data stored in the buffer into the assigned storage area in the disk device 109 starting from the readout beginning address. At this time, the CPU 101 recognizes the amount of data written into the disk device 109, and writes, into the data storage position table, data representing the size of the storage area into which the data is actually written. When the result obtained at step 1006 is NO, the CPU 101 writes data showing a predetermined size into the data storage position table.

Figure 5:
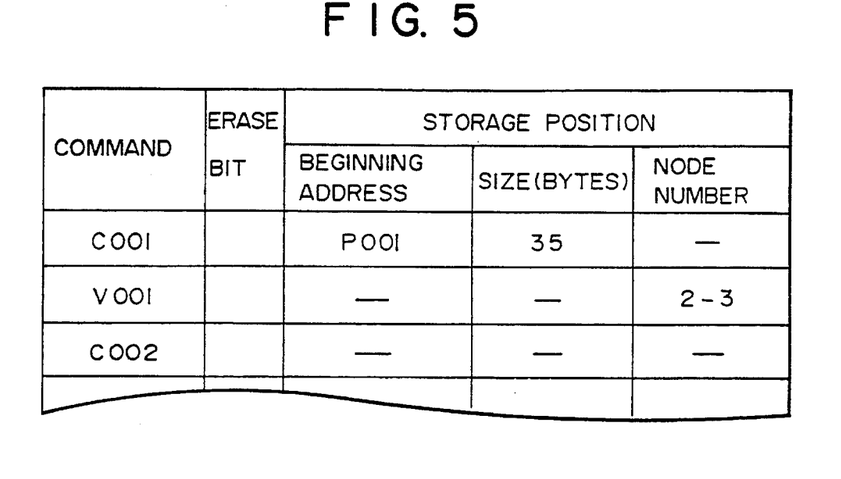
FIG. 5 is a diagram of a data storage position table.

FIG. 5 is a diagram of the data storage position table shown in FIG.4A. As shown, data regarding about the storage position in the disk device 109 is stored for each command (command name). More specifically, the data regarding about the storage position includes the beginning address of the storage area, and the size and the number of a node, the file data storage device of which is used as an alternative file data storage device. For example, if the data storage position table shown in FIG. 5 is related to the node 2-1 and the disk device 109 is filled with data when executing command "V001", the disk device 109 of the node 2-3 serves as an alternative file data storage device.

Figure 6:
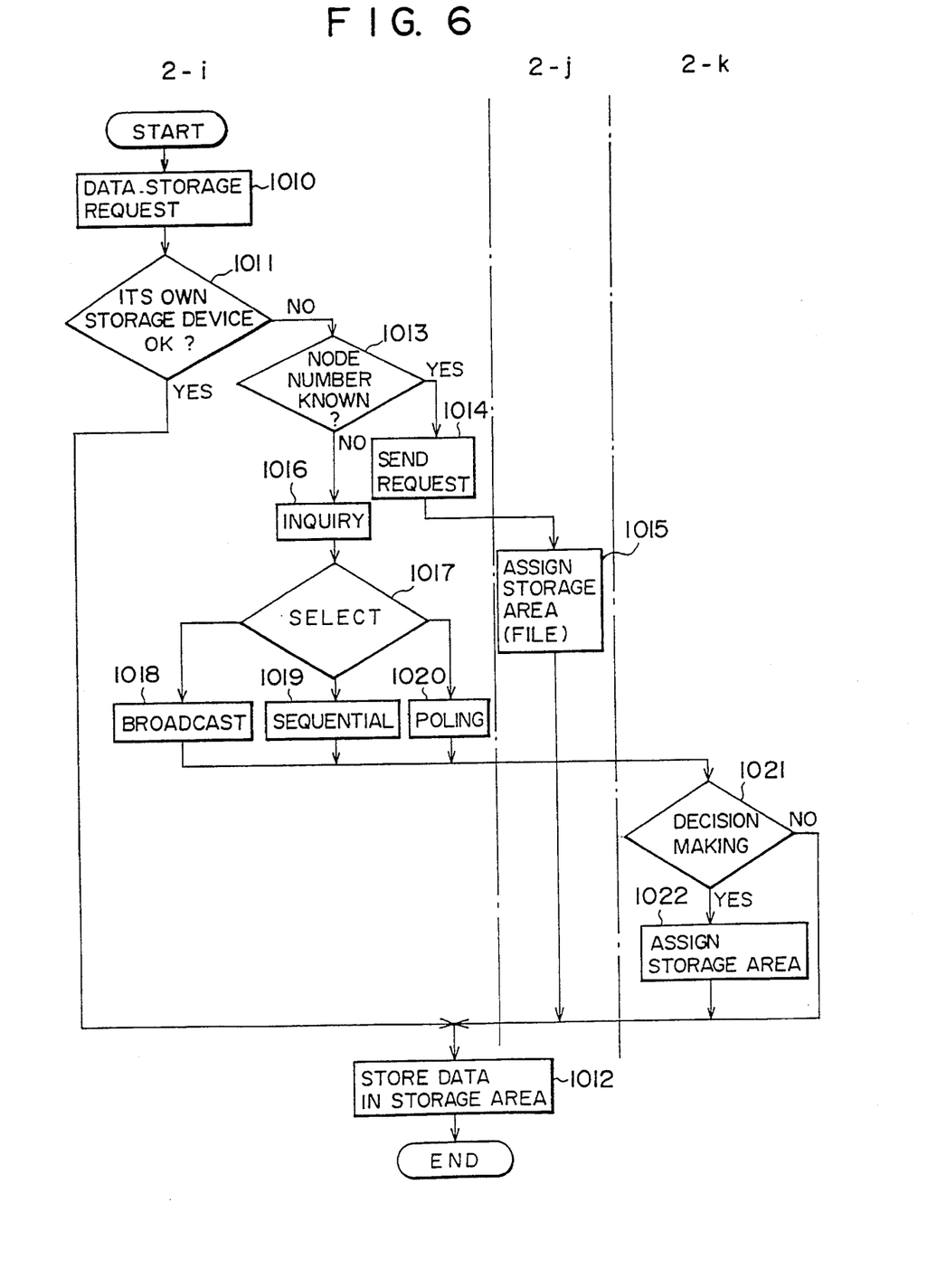
FIG. 6 is a flowchart of the operation of the first preferred embodiment of the present invention.

FIG. 6 is a flowchart of the data write procedure when the data write request is generated by an application program executed by the CPU 101 of the node 2-1. At step 1010, the CPU 101 of the node 2-1 receives the data write request generated by the application program being executed under the control of the CPU 101. As has been described with reference to FIG. 3A, the data write request has the write instruction, the previously assigned command, and write data. At step 101, the CPU 1011 accesses the data storage position table (shown in FIG. 5) stored in, for example, the RAM 103, and reads the beginning address of the assigned storage area and the size thereof.

Further, the CPU 101 determines whether or not the amount of the write data is greater than an available storage capacity of the disk device 109. If the result of this determination is NO, at step 1012 the CPU 101 writes the write data into the storage area of the built-in disc device 109 having the beginning address and size read out from the data storage position table. During this operation, if the amount of the write data is greater than the size read out from the data storage position table, an erase bit is written into a corresponding area in the data storage position table, and a new command is assigned to the write data. Then, the write data is stored in a new storage area related to the new command, and the size of the new storage area is written into the corresponding area of the data storage position table.

If it is determined, at step 1011, that the amount of the write data is greater than the available storage capacity of the disk device 109 of the node 2-1, at step 1013 the CPU 101 determines whether or not an alternative node (disk device) has been registered. For example, if the data write instruction being considered has command "V001" the node 2-3 is defined as the alternative node. If the alternative node is defined in the data storage position table, at step 1014 the CPU 101 communicate with the node 2-3 via one of the network controller 111 and the communication network 1. At step 1015, the CPU 101 of the node 2-3 registers the command and the size of the data write request from the node 2-1 in the data storage position table formed in, for example, the RAM 103 of the node 2-3. Thereby, a storage area in the disk device of the node 2-3 is assigned to the command of the data write request from the node 2-1. At step 1012, the CPU 101 writes the received write data into the assigned storage area of the disk device 109.

At step 1013, if it is determined that an alternative file data storage device is not defined for the data write request being considered, at step 1016 the CPU 101 of the node 2-1 executes an inquiry program stored in, for example, the ROM 102. The inquiry program has three inquiry procedures for sending to another node an alternative data storage device assignment request and asking whether or not the file data storage device (disk device 109) of the inquired node can serve as an alternative file data storage device. The above three inquiry procedures are a polling inquiry procedure 1020, a sequential inquiry procedure 1017, and a broadcast inquiry procedure 1018. The order of selection of the three procedures can be registered beforehand. It is also possible for the operator to determine which procedure should be executed, via the keyboard 105.

Figure 7A:
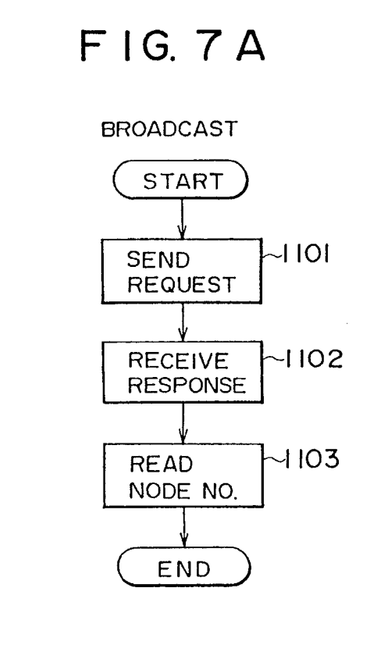
FIG. 7A is a flowchart of a broadcast inquiry procedure.

When the broadcast inquiry procedure 1018 is selected at 1017, the CPU 101 of the node 2-1 executes a program shown in FIG. 7A. At step 1101, the CPU 101 of the node 2-1 sends the alternative data storage device assignment request to the nodes 2-2 to 2-n via the communication network 1 at the same time. It is possible to design the communication network 1 so as to have a communication line specifically used for broadcasting. At step 1021 in FIG. 6, the CPU 101 of each of the nodes 2-2 - 2-n receives the alternative data storage device assignment request and determines whether or not its own disk device 109 has a capacity capable of serving as an alternative storage device for the node 2-1. If the result of this determination is YES, at step 1022 the node 2-3 sends back a response signal to the node 2-1. In this case, the response signal from, for example, the node 2-3 has the node number 2-3. At the same time, the CPU 101 of the node 2-3 assigns a storage area in its disk device 109. At step 1102, the CPU 101 of the node 2-1 receives the response signal and determines whether or not the node number is stored in the response signal. If the response signal does not have any node number, the disk device 109 of the corresponding node is not permitted to be used as an alternative storage device. If the response signal has the node number, the CPU 101 of the node 2-1 sends the write data to the corresponding node, for example, 2-3, and writes it into the disk device 109 of the node 2-3.

Figure 7B:
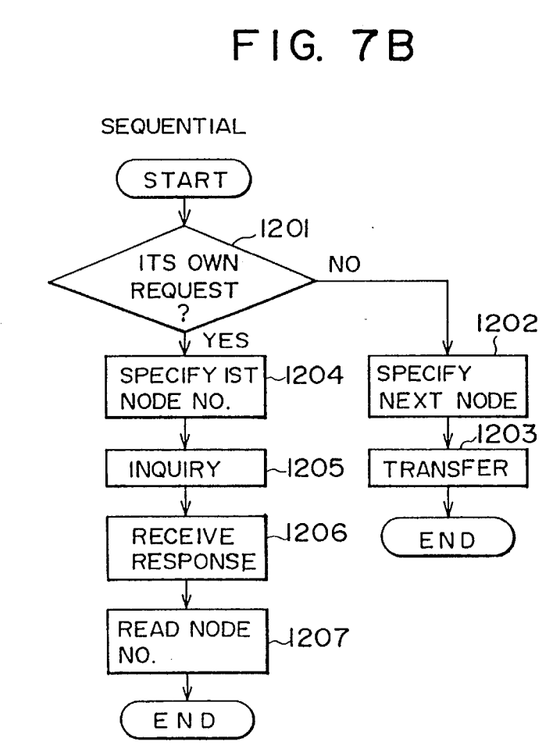
FIG. 7B is a flowchart of a sequential inquiry procedure.

FIG. 7B shows a program executed at step 1019 shown in FIG. 6. At step 1201, the CPU 101 of the node 2-1 determines whether or not it generates the alternative data storage device assignment request. In the example being considered, the result at step 1201 is YES. At step 1204, the CPU 101 of the node 2-1 specifies the first node number, which is determined beforehand. At step 1205, the CPU 101 sends the alternative data storage device assignment request to the specified node. Assuming that the first node number is 2-2, the CPU 101 of the node 2-2 executes step 1201 (which corresponds to step 1021 shown in FIG. 6). In this case, the result is NO. At step 1202, the CPU 101 of the node 2-2 reads out from the node number which is positioned next to the node 2-2 and which is stored in, for example, the RAM 103. For example, the node next to the node 2-2 is the node 2-3. At step 1203, the CPU 101 of the node 2-2 sends the received alternative data storage device assignment request to the next node 2-3. The steps 1202 and 1203 are executed if the disk device 109 of the node 2-2 is not used as an alternative storage device for the node 2-2. If the disk device 109 of the node 2-2 is allowed to be used as an alternative storage device for the node 2-2, the CPU 101 of the node 202 executes step 1022 shown in FIG.6. Then, the CPU 101 of the node 2-2 sends back the response signal to the node 2-1.

At step 1206, the CPU 101 of the node 2-1 receives the response signal. At step 1207, the CPU 101 of the node 2-1 reads the node number in the response signal, and sends the write data to the node having the node number specified in the response signal. At step 1012, the write data is written into the corresponding disk device 109.

Figure 7C:
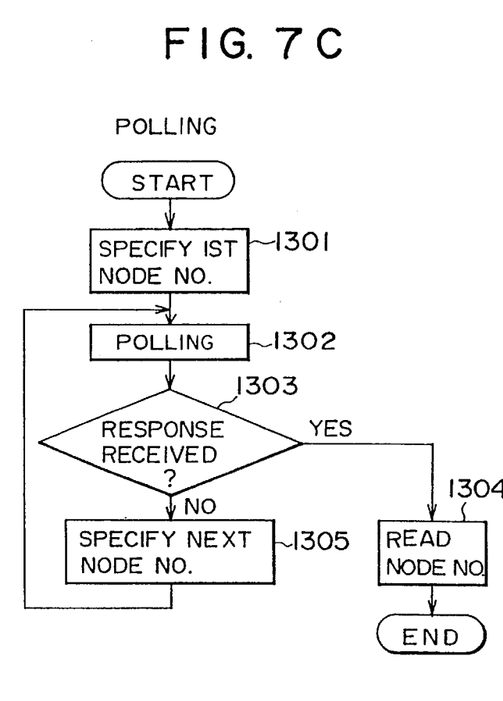
FIG. 7C is a flowchart of a polling inquiry procedure.

FIG. 7C shows a program executed at step 1020. At step 1301, the CPU 101 of the node 2-1 specifies the first node number, which is determined beforehand. At step 1302, the CPU 101 of the node 2-1 sends the alternative data storage device assignment request to the node having the first node number by a polling procedure. At step 1303, the CPU 101 of the node 2-1 determines whether or not the response signal is received. If the result is YES, the CPU 101 of the node 2-1 executes step 1304, at which step the node number in the response signal is read. At step 1012, the node 2-1 sends out the write data to the node. When the result obtained at step 1303 is NO, the CPU 101 of the node 2-1 specifies the next node number, and executes step 1302.

Figure 8:
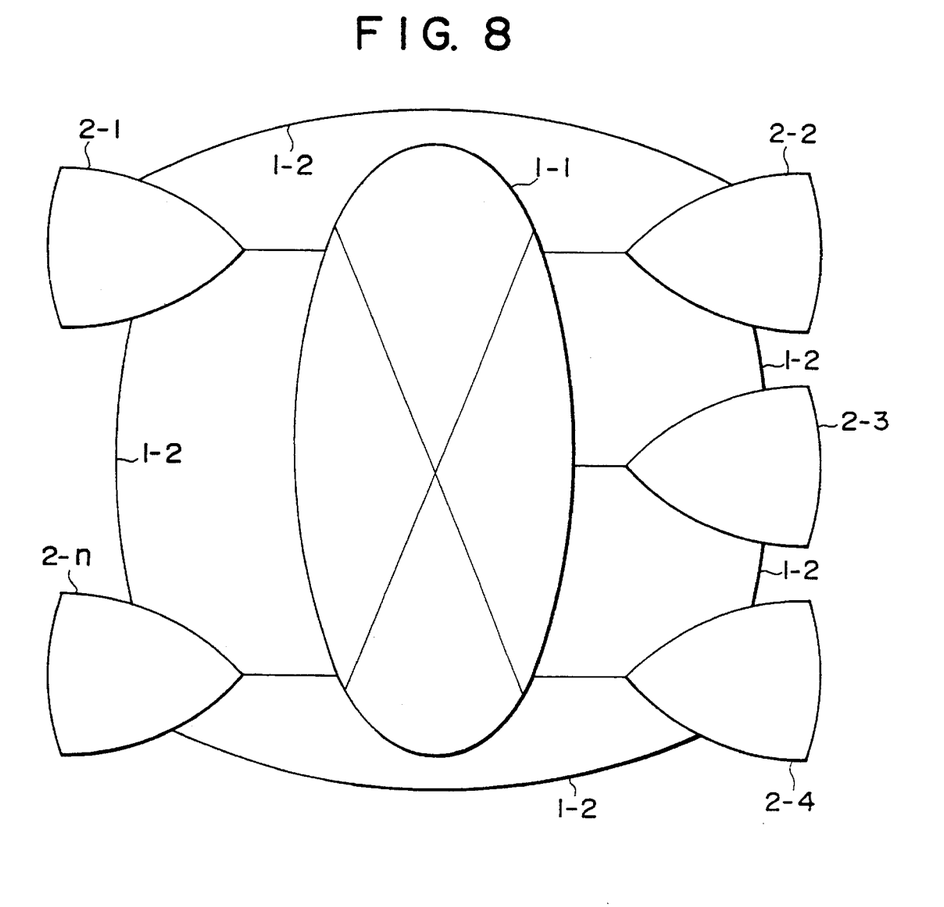
FIG. 8 is a block diagram of an example of a communication network.

FIG. 8 is a diagram of an example of the communication network 1. The nodes 2-1 - 2-n are coupled via a public network 1-1 by and specific lines 1-2, which directly couple the nodes with each other. The public network 1-1 may be a satellite communication network.

Figure 9:
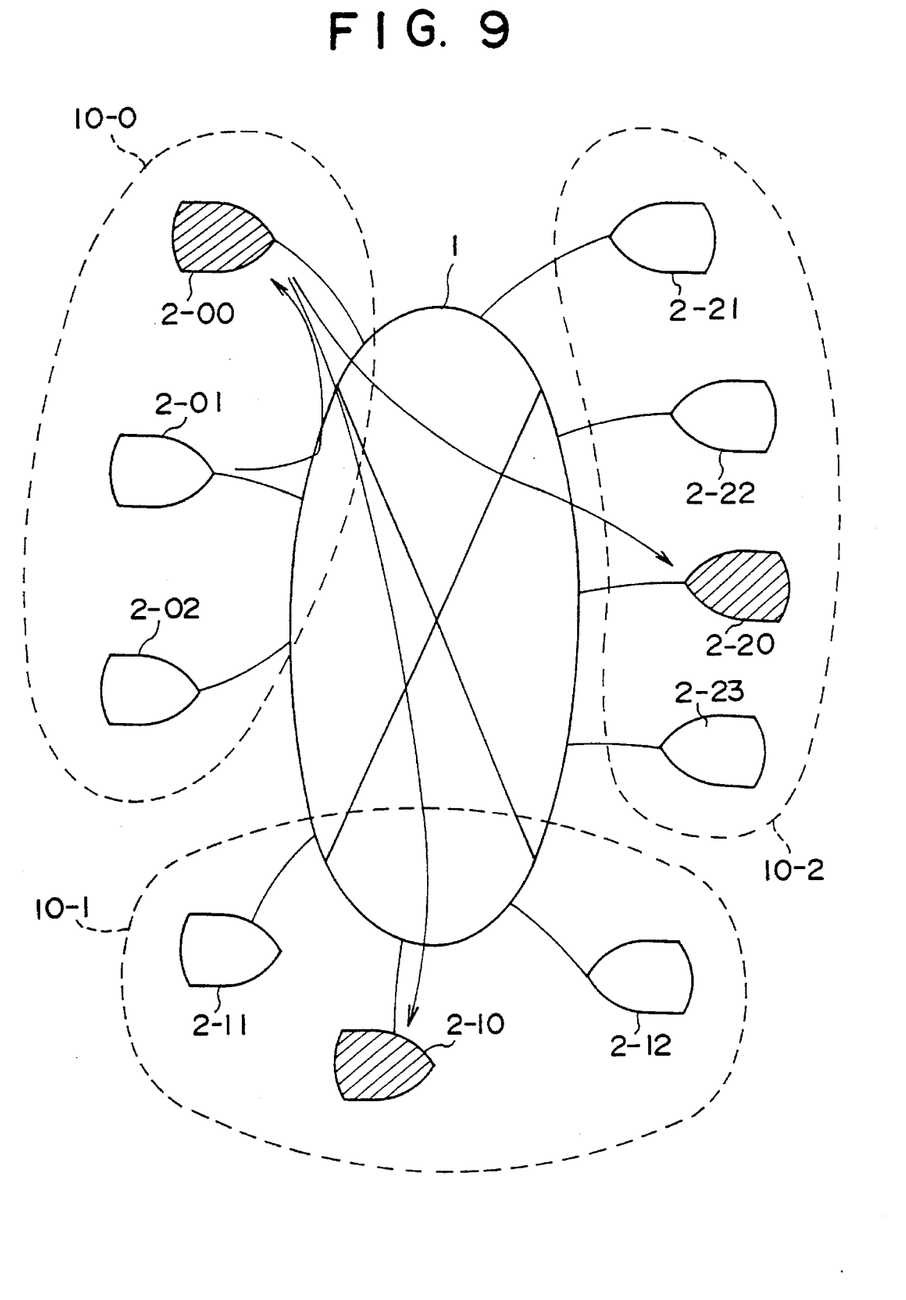
FIG. 9 is a block diagram of an outline of a database system according to a second preferred embodiment of the present invention.

FIG. 9 is a diagram showing an outline of a database system according to a second preferred embodiment of the present invention. The database system shown in FIG. 9 includes a plurality of nodes which are connected to the network 1 and grouped. In FIG. 9, nine nodes are grouped into three groups. A group 10-0 consists of nodes 2-00, 2-01 and 2-02. A group 10-1 consists of nodes 2-10, 2-11 and 2-12. A group 10-3 consists of nodes 2-20, 2-21, 2-22 and 2-23. The groups 10-0 - 10-2 have provisional center nodes 2-00, 2-10 and 2-20, respectively. Each node shown in FIG. 9 has the same structure as shown in FIG. 2.

The provisional center node 2-i0 (i=0, 1, 2) of the group 10-i manages data regarding the data storage position table (FIG. 5) related to the disk device 109 (file data storage device) of each node in the group 10-i. For example, the provisional center node 2-10 manages data about the data storage position tables related to the disk devices 109 of the nodes 2-01 and 2-02 in addition to its own data storage position table. For example, such data is stored in the RAM 103. If each of the nodes 2-01 and 2-02 generates the alternative data storage device assignment request, each corresponding such request is sent to the provisional center node 2-00. For example, each provisional center node has a table which defines the command name and the related node number.

Figure 10:
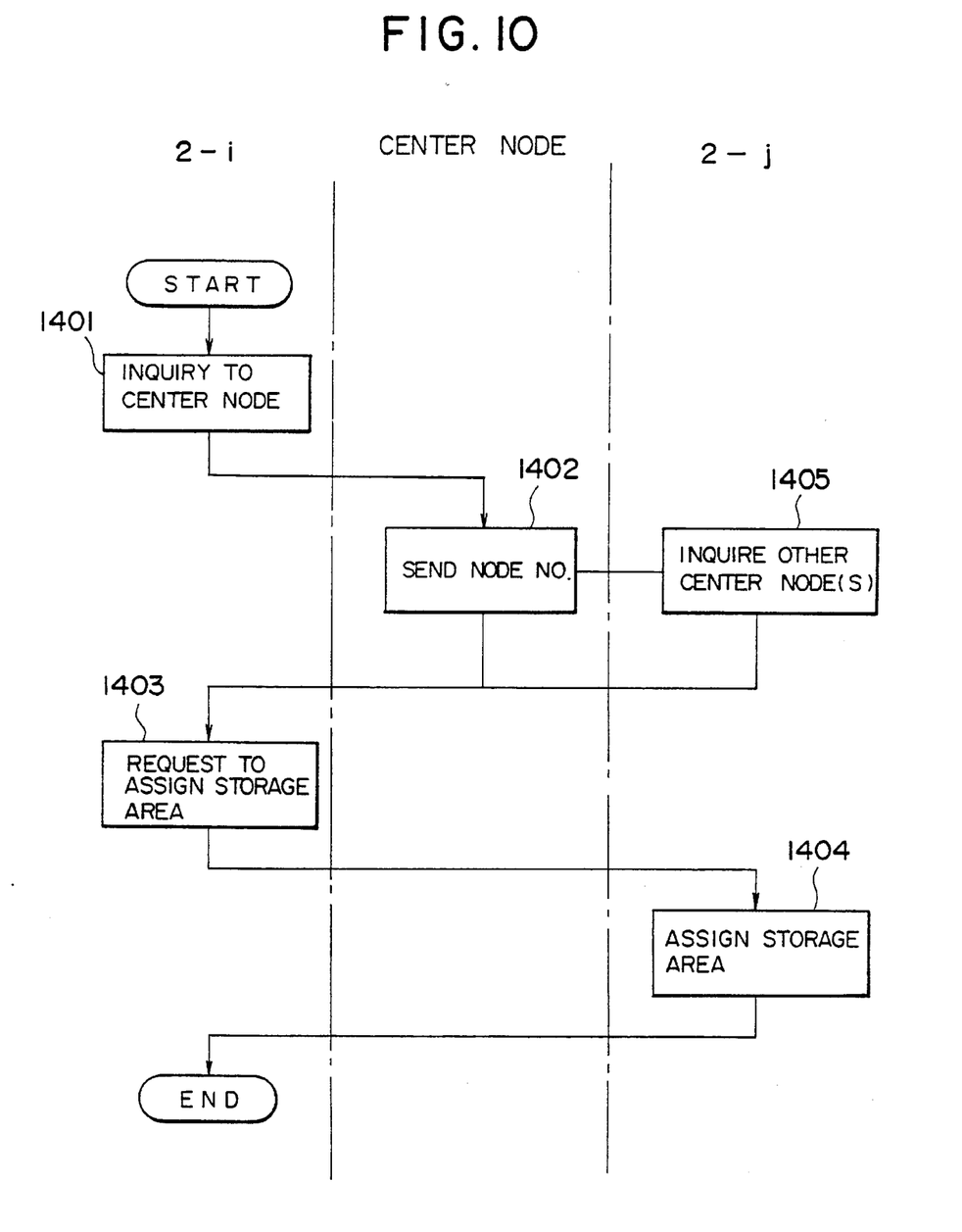
FIG. 10 is a flowchart of the operation of the second preferred embodiment of the present invention.

Referring to FIG.10, at step 1401, the CPU 101 of, for example, the node 2-01 sends the alternative data storage device assignment request to the provisional center node 2-00. At step 1402, the CPU 101 of the provisional center 2-00 refers to the data about the data storage position tables related to the nodes 2-00 and 2-02, and determines whether or not there is a node which can accept the alternative data storage device assignment request. If the node 2-02 can accept the request, the CPU 101 of the provisional center node 2-00 sends, to the node 2-01, a response signal including the node number 2-02. At step 1403, the node 2-01 receives the response signal, and sends to the node 2-02 the alternative data storage device assignment request. In response to this request, at step 1404, the CPU 101 of the node 2-02 assigns a storage area in its own disk device 109, and writes data from the node 2-01 therein.

At step 1402, if there is no node which can accept the alternative data storage device assignment request from the node 2-01, at step 1405 the CPU 101 of the provisional center node 2-00 inquires the provisional center nodes 2-10 and 2-20 of the other groups 10-1 and 10-2, in accordance with the broadcast, sequential or polling inquiry procedure. Assuming that the provisional center node 2-10 receives the inquiry from the provisional center node 2-00 by the polling procedure, the provisional center node 2-10 determines whether or not any one of the nodes 2-10 - 2-12 can accept the alternative data storage device assignment request from the node 2-01. If the result of this determination is affirmative, the provisional center node 2-10 sends the response signal to the provisional center node 2-00.

In the above-mentioned embodiments of the present invention, the data read operation can be executed in almost the same manner as the data write operation, because the data read request shown in FIG. 2B is the same as the data write request shown in FIG. 2A except that the data read request does not have data.

The present invention is not limited to the specifically disclosed embodiments, and variations and modifications may be made without departing from the scope of the present invention.

What is claimed is:

1. A database system comprising:

a communication network;

a plurality of nodes coupled to said communication network, each of the nodes comprising, in respective association therewith:

a data storage device for storing data, management means, coupled to said data storage device, for managing a status of the data stored in said data storage device, data storage request means, coupled to said data storage device and said management means, for generating an alternative data storage device assignment request, to which data may be related, for requesting at least one other node, of said plurality of nodes, to store the related data in the data storage device respectively associated with said at least one other node, via said communication network, when a predetermined condition is satisfied, and determining means, coupled to said management means and operative when the node, as a receiving node, receives an alternative data storage device assignment request from a requesting, other node which generates the alternative data storage device assignment request, for assigning a storage area in the associated data storage device for storing data related to the alternative data storage device assignment request by referring to the status of the data managed by said management means when the associated data storage device of said node, as a receiving node, has sufficient storage capacity to store the data related to the alterative data storage device assignment request;

said plurality of nodes being arranged in a plurality of groups and each group, of the plurality of groups, having a corresponding plurality of associated nodes and a corresponding provisional center node, said corresponding provisional center node of each said group further comprising means for managing a status of the associated data storage means of each of the nodes of its particular group;

said data storage request means of each of the other associated nodes of a group further comprising means for sending the alternative data storage device assignment request to the provisional center node of its particular group; and the determining means of the provisional center node, of each said group, further comprising decision means for determining which node of its particular group can accept the alternative data storage device assignment request by referring to the status of the respectively associated data storage means of each of the other nodes of its particular group.

2. A database system as claimed in claim 1, wherein each of said nodes further comprises:

response generating means for generating a response signal, having a node number, and transmitting the response signal to the requesting node when the storage area is assigned; and communication means for sending the related data, to be written into the storage area assigned thereto in the associated data storage device of said other, receiving node.

3. A database system as claimed in claim 1, wherein said data storage request means further comprises means for specifying one of the other nodes as a receiving node and for sending, via said communication network, the alterative data storage device assignment request to the specified, receiving node by a polling procedure.

4. A database system as claimed in claim 1, wherein said data storage request means further comprises means for sending the alternative data storage device assignment request to the communication network so that the alternative data storage device assignment request is sequentially transferred to each of the other nodes.

5. A database system as claimed in claim 1, wherein said data storage request means comprises means for simultaneously sending the alternative data storage device assignment request to the communication network by a broadcasting procedure so that the alternative data storage device assignment request is sent to each of the other nodes at substantially the same time.

6. A database system as claimed in claim 1, wherein said status of the data managed by said management means includes information specifying the type of data stored in the associated data storage device and information indicating the amount of the stored data.

7. A database system as claimed in claim 1, wherein said corresponding provisional center node of each group, of the plurality of groups, further comprises means for transferring the alterative data storage device assignment request to said decision means of the respective provisional center node of each of the other groups when said decision means determines that there is no node in its particular group which can accept the alternative data storage device assignment request.

* * * * *

UNITED STATES PATENT AND TRADEMARK OFFICE
CERTIFICATE OF CORRECTION

PATENT NO. : 5,463,381
DATED : Oct. 31, 1995
INVENTOR(S) : RYU et al.

It is certified that error appears in the above-indentified patent and that said Letters Patent is hereby corrected as shown below:

TITLE PAGE:

[54] Title, line 3, after "VIA" insert --A--.
[75] Inventors: Change "Kanagawa" to --Kawasaki--.
[56] U.S. Patent Documents: Change "Hailsern et al." to --Hailpern et al.--.

Col. 1, line 3, after "VIA" insert --A--.

Col. 3, line 55, after "vector" delete "1".

Col. 4, line 55, after ""V001"" insert --,--.

Col. 6, line 21, change "by and" to --and by--.

Col. 7, line 3, after "2-20" insert --,--.

Col. 8, line 29 (Claim 3, line 4), change "alterative" to --alternative--.

Signed and Sealed this

Eleventh Day of June, 1996

Attest:

BRUCE LEHMAN

*Attesting Officer*   Commissioner of Patents and Trademarks